United States Patent
Quindt

(10) Patent No.: US 6,672,645 B2
(45) Date of Patent: Jan. 6, 2004

(54) CONVERTIBLE HAVING A TOP STORABLE UNDERNEATH A PLANE OF A TOP COVER

(75) Inventor: Reinhard Quindt, Farmington, MI (US)

(73) Assignee: Wilhelm Karmann GmbH, Osnabrück (DE)

( * ) Notice: Subject to any disclaimer, the term of this patent is extended or adjusted under 35 U.S.C. 154(b) by 0 days.

(21) Appl. No.: 10/065,506

(22) Filed: Oct. 25, 2002

(65) Prior Publication Data

US 2003/0080581 A1 May 1, 2003

(30) Foreign Application Priority Data

Oct. 27, 2001 (DE) .......................... 101 53 137

(51) Int. Cl.[7] ................................. B60J 7/20
(52) U.S. Cl. ......................... 296/107.08; 296/107.16; 296/107.07; 296/136.04; 296/136.05
(58) Field of Search ................. 296/107.01, 107.08, 296/107.16, 107.17, 136.01, 136.04, 136.05, 136.06

(56) References Cited

U.S. PATENT DOCUMENTS

| 3,338,624 | A | * | 8/1967 | Champion | |
|---|---|---|---|---|---|
| 4,687,247 | A | * | 8/1987 | Muscat | 296/136 |
| 4,799,729 | A | * | 1/1989 | Muscat | 296/136 |
| 6,030,023 | A | * | 2/2000 | Guillez | 296/136 |
| 6,145,915 | A | | 11/2000 | Queveau et al. | |
| 6,425,621 | B2 | * | 7/2002 | Miklosi et al. | 296/107.08 |
| 6,454,343 | B1 | * | 9/2002 | Wagner et al. | 296/107.08 |
| 6,520,561 | B1 | * | 2/2003 | Miklosi et al. | 296/136 |
| 2003/0020298 | A1 | * | 1/2003 | Koch | 296/107.08 |

FOREIGN PATENT DOCUMENTS

| DE | 196 37 038 | 1/1998 |
|---|---|---|
| DE | 197 14 105 | 10/1998 |
| DE | 199 43 860 | 3/2001 |

* cited by examiner

Primary Examiner—Stephen T. Gordon
Assistant Examiner—Hilary Gutman
(74) Attorney, Agent, or Firm—Gudrun E. Huckett

(57) ABSTRACT

A convertible has a top storable in the rear of the convertible when the top is open. A top cover is provided and the top is stored underneath the top cover when open. The top cover is movable for releasing a passageway for the top via which the top is moved for storing the top and for returning the top from the open position into the closed position. An extension member is pivotably connected to the top cover. In the open position of the top, the extension member is positioned substantially in front of the top cover, when viewed in the travel direction of the convertible. The extension member is pivotable relative to the top cover such that the extension member, when the top is closed, is positioned in a stored position at substantially a right angle to the top cover underneath the top cover.

10 Claims, 4 Drawing Sheets

CONVERTIBLE HAVING A TOP STORABLE UNDERNEATH A PLANE OF A TOP COVER

BACKGROUND OF THE INVENTION

1. Field of the Invention

The invention relates to a vehicle of the convertible type (for short: convertible) comprising a top that can be stored in the rear of the vehicle underneath a lid part, wherein the lid part is movable for releasing a passageway for the top and wherein the lid part has correlated therewith an extension member which is movable relative to the lid part and, in the closed position of the top, is positioned in a stored position below the lid part and, in an open position of the top, is positioned substantially in front of the lid part, when viewed in the travel direction of the vehicle.

2. Description of the Related Art

German document 1 99 43 860 A1 describes a convertible comprising a lid part which delimits an upper side of a receptacle for the top when opened and which has an extension member moveable parallel to the lid part. When the top is open, the extension member is aligned with the lid part in the travel direction and extends it in this way. When the top is closed, the extension member is positioned below the lid part in a position parallel thereto and its topside faces upwardly. In order to minimize the size of the extension member in the longitudinal direction of the vehicle, lateral portions of the extension member, which face forwardly in an extended position and can be folded in and out, provide a division of the extension member; this configuration requires an additional drive mechanism for the movement of the extension member parts relative to one another. Even when the lateral parts are in the folded position, the extension member has still a relatively large size in the longitudinal direction of the vehicle. It is therefore necessary to provide a large space for receiving the extension member and to accommodate the length of the lid part in the longitudinal direction of the vehicle. In certain vehicle types such as pickup trucks or vehicles with a very short rear area, it is however desirable to limit the longitudinal extension of the lid part in response to the minimal space that is available or in order not to limit unnecessarily the available space.

U.S. Pat. No. 6,145,915 describes a convertible in which the top can be placed underneath the trunk lid in the rear area of the vehicle. In the forward area of the trunk lid, viewed the travel direction, an extension member is pivotably connected so that it can be folded in and out. When the top is closed, the extension member is pivoted either into a position below the closed top and aligned approximately with the trunk lid or, in the case of a rear top part provided with an integrated rear deck, into an approximately parallel position below the closed trunk lid. In the latter position, the extension member penetrates the trunk substantially transversely and projects into the closed trunk area so that the trunk space is reduced. For opening and closing the top, several pivot movements of the top must be realized, and this makes handling more difficult.

The German patent 1 96 37 038 C1 describes a cover for an elongate linkage passageway of a folding top of a convertible whose covering means can be folded upwardly from a position substantially covering the opening of the passageway, when the top is open, into a retracted position substantially releasing the opening of the passageway. The covering means is a flexible tightening strap which, when in its covering position, is tentered tautly along the correlated opening of the passageway. A cover plate functioning as a rear deck is provided which covers a frame opening in the upward direction when the top is closed. This cover for the frame opening comprises spring-elastic lateral flaps which project upwardly when the top is closed and can be folded into a covering position as a result of the spring load. The lateral flaps which project into the interior of the vehicle however cannot be folded into a stored position underneath a cover.

SUMMARY OF INVENTION

It is an object of the present invention to provide a convertible with a top which can be stored underneath the plane of a top cover wherein a minimal storage space in the longitudinal direction of the vehicle should be required for receiving the extension member below the top cover.

In accordance with the present invention, this is achieved in that the extension member is pivotable relative to the top cover and is arranged at a right angle, or nearly at a right angle, relative to the top cover when the extension member is in the stored position.

In the vehicle of the convertible type (convertible), it is no longer required to provide underneath or below the top cover the space for the length of the extension member in the longitudinal direction of the vehicle; only a significantly reduced length is needed. The extension member in the stored position can be arranged vertically or nearly vertically in the space underneath the top cover. This is very advantageous, for example, for tall vehicles such as pickup trucks because they have a tall storage space but the length of the open cargo space is to be reduced as little as possible.

By providing the possibility of arranging covering parts for the linkage parts completely underneath the top cover or the extension member when the top is open, these covering parts are thus also arranged in a space-saving way. In particular, they do not require additional space in the longitudinal direction of the vehicle. For example, they can be moved inwardly such that they are positioned in an area in which the linkage parts move laterally past them.

DETAILED DESCRIPTION

Figure 1:
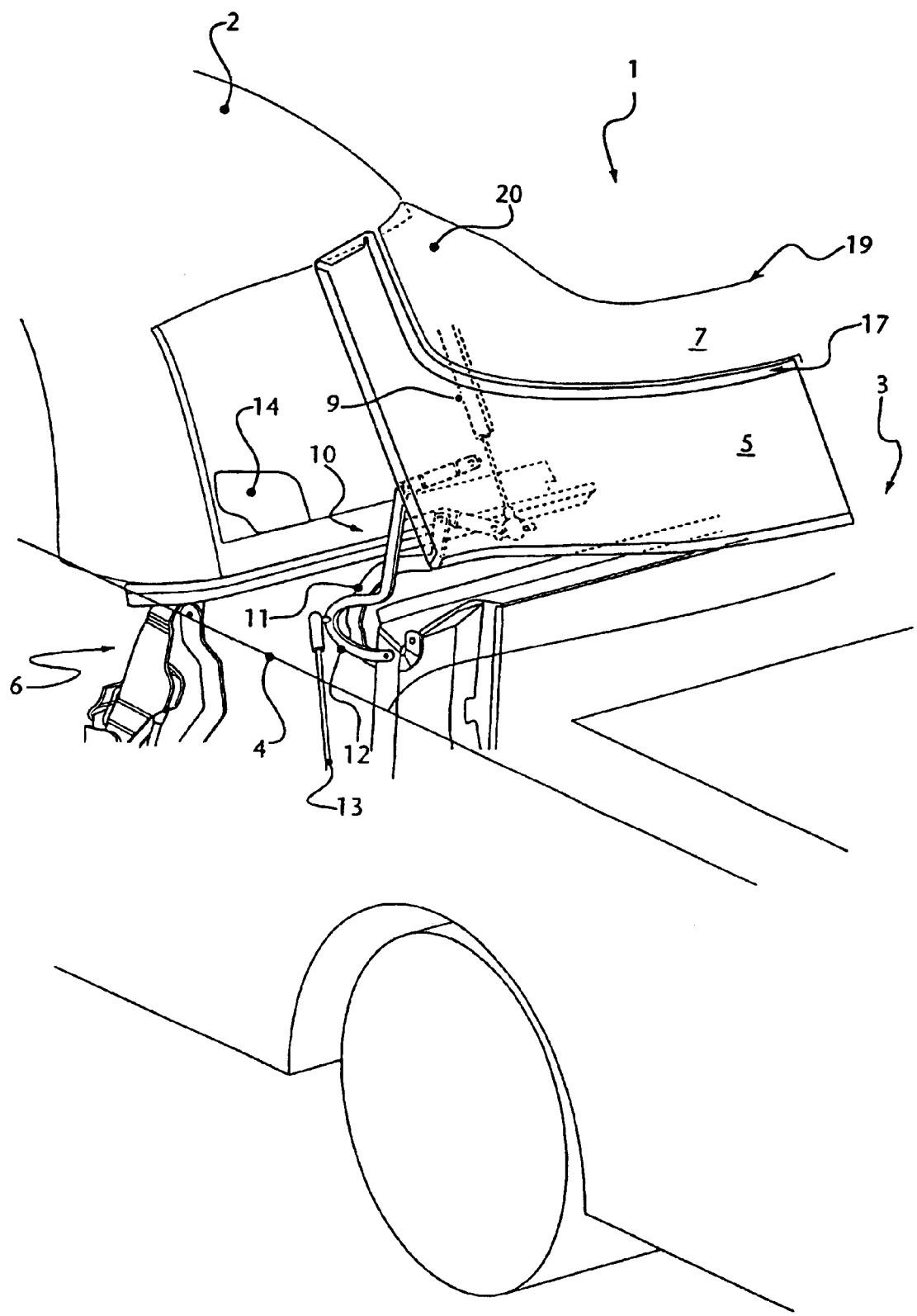
FIG. 1 shows schematically a convertible embodied as a pickup truck in a broken-off view from the rear at an angle, showing the top cover in the open position and the extension member in the extended position.

The convertible 1 illustrated in the drawings has a top 2 which is either a hardtop or at least partially embodied to be flexible and covered with a textile lining (cloth). The top 2 can be stored in the rearward vehicle area 3 underneath the plane 4 of a top cover 5. The top 2 is connected by linkage parts 6 with laterally arranged main bearings, respectively. When the top 2 is closed (FIG. 1), the linkage parts 6 project through the plane 4 of the top cover 5.

The top cover 5 has a plate-shaped extension member 7 which like the top cover 5, is comprised, for example, of plastic material, light metal, foamed metal materials or other known car body construction materials. The extension member 7 is connected pivotably to the top cover 5. In order to realize this pivot movement, drive members 9, in the illustrated embodiment hydraulic cylinders, are arranged on the corresponding outer sides of the vehicle.

Figure 3:
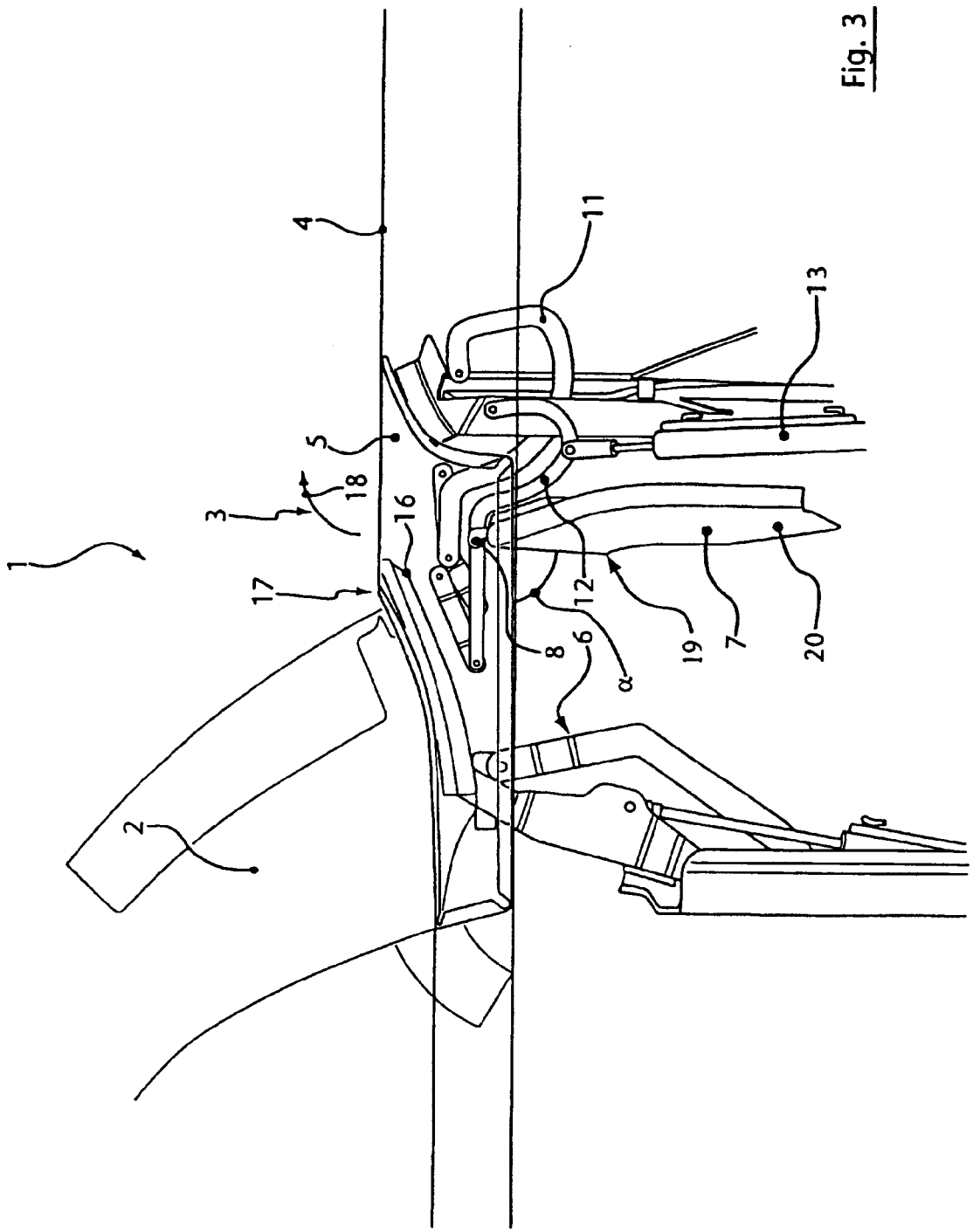
FIG. 3 is a view similar to FIG. 2 showing the top in the closed position and the top cover in the closed position.
Figure 4:
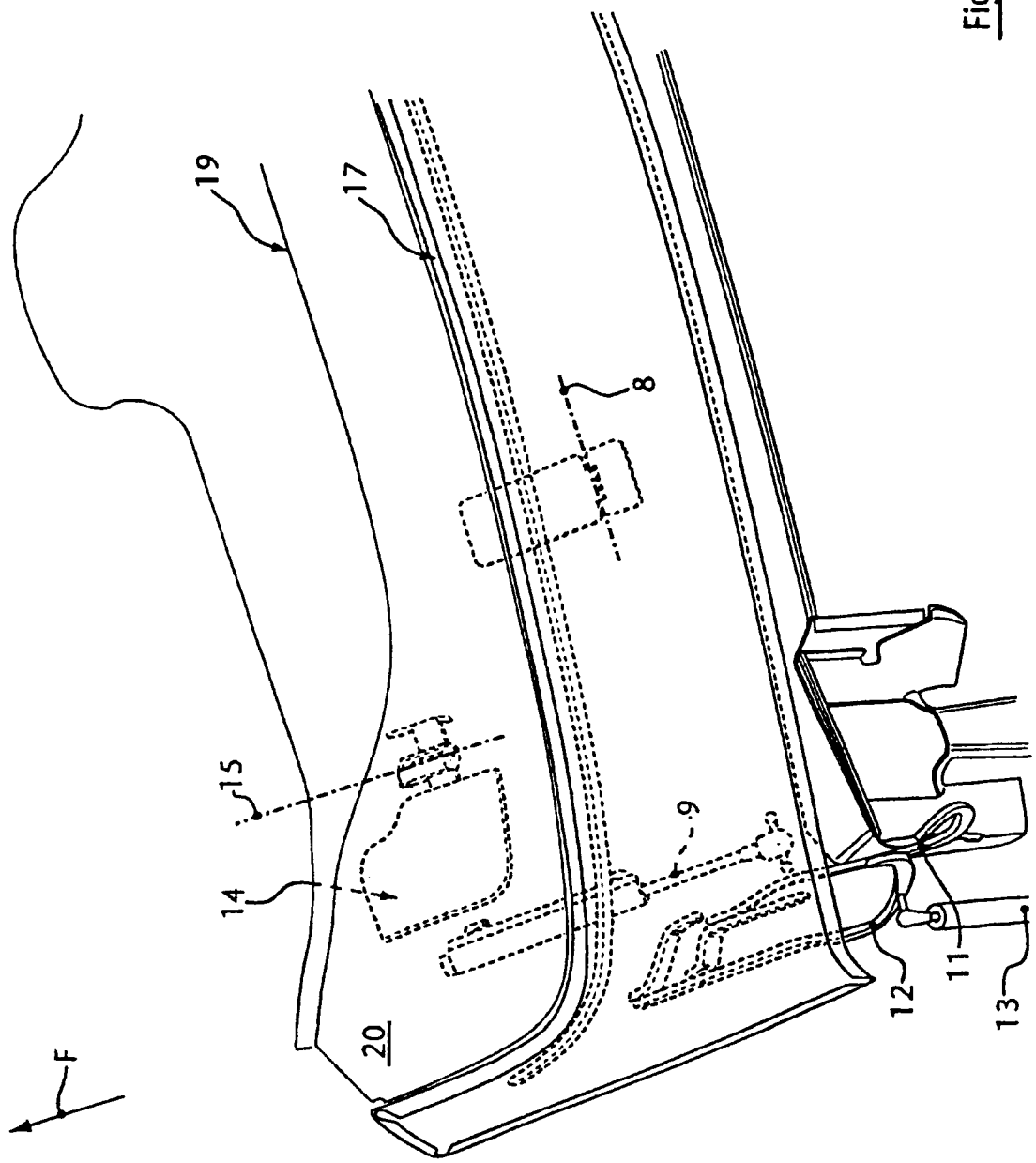
FIG. 4 shows the top cover and the extension member, aligned with top cover, in the extended position and the top in the open position in a view at an angle from above.

The pivotability of the extension member 7 allows its movement between a position (FIG. 1, FIG. 4), in which it is aligned with the top cover 5 of the top and extends the top cover 5 toward the vehicle front, and a position (FIG. 2 and FIG. 3), in which it is positioned perpendicularly or nearly perpendicularly relative to the top cover 5, i.e., at a relative angle (α) that is a right angle or substantially a right angle.

The rearward area of the top cover 5 is connected by means of a multiple joint arrangement 10 with the car body wherein the lower areas of the links 11, 12 of the multiple joint arrangement 10 have a shape like a gooseneck or swanneck. At least one drive member 13 engages with one end of the links 11, 12 and is connected with its other end to the car body.

Below the plane 4, in which the top cover 5 and the extension member 7 are positioned when the top is open, covering parts 14 for the linkage parts 6 of the top 2 are provided. These covering parts 14 are pivotable about axes 15 which extend horizontally and parallel to the travel direction F of the vehicle. When the top is open and the top cover 5 is closed, the covering parts 14 are positioned substantially in a horizontal position closely underneath the extension member 7. When the top 2 is closed, the covering parts 14 are also horizontally positioned but they can be positioned nearly upright (vertical) for opening the top 2 (FIG. 1) and, possibly, can be pivoted into a slightly outwardly rotated or slantedly upright position. In this connection, the covering parts 14 can rest against the linkage parts 6 in order to thus shield them from the vehicle interior and in order to prevent passengers from coming into contact with the linkage parts 6. The upper side of the covering parts 14, which faces the interior when the covering parts 14 are in the upright position, can be provided with a lining which matches the interior of the vehicle, for example, a textile material (cloth) or leather.

In the closed position of the top 2 and in the closed position of the top cover 5 (FIG. 3), a rearward edge 16 of the top 2, which is embodied as a water drainage channel, is engaged from above by the forward edge area 17 of the top cover 5. The top cover 5 for the top 2 can thus be pivoted into an open position by the multiple joint arrangement 10 in the direction of the arrow 18 without the rearward portion of the top 2 having to be opened already. In this way, opening of the top 2 can be carried out particularly quickly.

Figure 2:
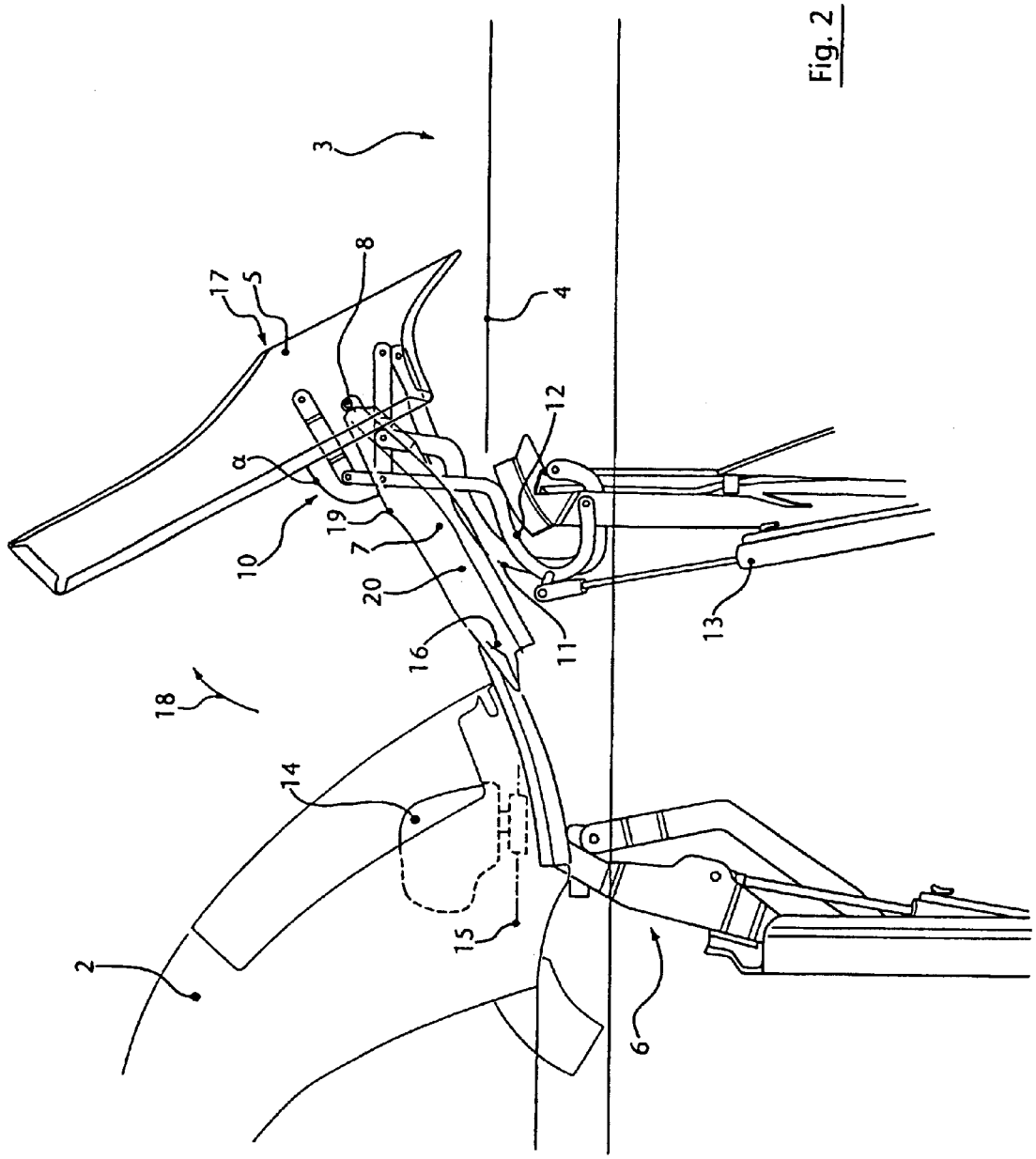
FIG. 2 is a side view of the vehicle according to FIG. 1, showing the top cover in the open position and the extension member positioned substantially perpendicularly relative to the top cover.

In the first movement phase of opening the top cover 5, when the top 2 is in the closed position, the extension member 7 connected to the top cover 5 remains in its position perpendicular to the top cover 5. As a result of the gooseneck hinge or link and the multiple joint arrangement, the top cover 5 upon pivoting is moved backward counter to the travel direction F such that the extension member 7 in its position extending perpendicularly to the top cover 5 can be moved past the rearward edge 16 of the top 2 (FIG. 2). In the area of a vertical longitudinal center plane of the vehicle, the forward edge 19 has a distance from the rearward edge 16 when passing along the rearward edge 16 such that the lateral areas 20 of the extension member 7 can still move past the lateral extensions of the rearward edge 16.

After passing the rearward edge 16, the extension member 7 can then be moved, by being acted upon by the drive members 9, into the aligned position relative to the top cover 5 (FIG. 1). The top 2 can now be opened wherein, when the top 2 is closed as well as during the opening movement, the covering parts 14 are always in an upright position and are moved into the horizontal position only after the top 2 has been stored. The top cover 5 with the extended extension member 7 as a whole can then be closed above the horizontally positioned covering parts 14 so that they are moved into a horizontal position, invisible from the exterior, underneath the extension member 7.

In the illustrated embodiment, the pivotability of the extension member 7 relative to the top cover 5 is realized such that the extension member 7 is connected with a simple pivot hinge (pivot axis 8) on the top cover 5. However, it is also possible to provide a multiple joint arrangement for this purpose. In particular, it is also possible during pivoting of the top cover 5 to even enlarge the angle α between the top cover 5 and the extension member 7 in order to ensure that the forward edge 19 of the extension member 7 can move past the rearward edge 16 of the top 2 even in the case of unfavorable spatial conditions.

When opening the top 2, the telescoping movement of the drive members 9 and thus the parallel positioning of the extension member 7 relative to the top cover 5 is realized only after passing the edge 16. However, it is not necessary to wait until the top cover 5 has been completely pivoted into the open position; instead; this, opening movement of the top cover 5 can be overlapped partially by the pivot movement of the extension member 7 from the perpendicular into the parallel position. This holds true also for the subsequent pivoting of the top 2 about the main bearings into the open position.

For closing the top, the aforementioned movements are carried out in the reverse sequence.

The configuration of the covering parts 14 according to the invention can also be used expediently, for example, for a unitary or monolithic top cover 5 of a storage compartment of a top or for a top cover 5 whose extension member is situated parallel to the top cover 5 in the stored position.

While specific embodiments of the invention have been shown and described in detail to illustrate the inventive principles, it will be understood that the invention may be embodied otherwise without departing from such principles.

What is claimed is:

1. A convertible (1) comprising:
    a top (2) storable in a rear part of the convertible when the top (2) is in an open position;
    a top cover (5), wherein the top (2) in the open position is stored underneath the top cover (5);
    wherein the top cover (5) is movable for releasing a passageway opening for the top (2) via which the top (2) is moved for storing the top (2) in the open position and for returning the top (2) from the open position into a closed position;
    an extension member (7) pivotably connected to the top cover (5);
    wherein, in the open position of the top (2), the extension member (7) is positioned substantially in front of the top cover (5), when viewed in the travel direction (F) of the convertible;
    wherein the extension member (7) is pivotable relative to the top cover (5) such that the extension member (7), when the top (2) is in the closed position, is positioned in a stored position at a relative angle (α) to the top cover (5) underneath the top cover (5), wherein the relative angle (α) in the stored position is a right angle or substantially at a right angle; and at least one first drive member (9) connected to the top cover (5) and the extension member (7), wherein the at least one first drive member (9) is configured to carry out a pivot movement of the extension member (7) relative to the top cover (5).

2. The convertible according to claim 1, comprising a multiple joint arrangement (10) connected to a rearward end of the top cover (5) and configured to pivot the top cover (5).

3. The convertible according to claim 2, comprising at least one second drive member (13) connected with a first end to a car body of the convertible, wherein the multiple joint arrangement (10) has links (11, 12) having a gooseneck shape and connected to a second end of the at least one second drive member (13).

4. The convertible according to claim 1, wherein, in a first movement phase of pivoting the top cover (5) into the open position for releasing the passageway opening, the relative angle (α) between the top cover (5) and the extension member (7) is almost or completely unchanged relative to the stored position of the extension member (7).

5. The convertible according to claim 1, wherein a rearward part of the top (2) comprising a rear window has a rearward edge (16) and wherein the top cover (5) has a forward edge area (17), wherein the rearward edge (16), in the closed position of the top (2), is engaged from above, at least over portions thereof, by the forward edge area (17) of the top cover (5), wherein the top cover (5) is configured to open when the top (2) is in the closed position.

6. The convertible according to claim 1, comprising a pivot hinge having a pivot axis (8) and connected to the extension member (7) and the top cover (5), wherein the pivot hinge is configured to pivot the extension member (7) relative to the top cover (5) about the pivot axis (8).

7. A convertible comprising:

a top (2) storable in a rear part of the convertible when the top (2) is in an open position;

a top cover (5), wherein the top (2) in the open position is stored underneath the too cover (5);

wherein the too cover (5) is movable for releasing a passageway opening for the top (2) via which the top (2) is moved for storing the top (2) in the open position and for returning the top (2) from the open position into a closed position;

an extension member (7) pivotably connected to the top cover (5);

wherein, in the open position of the top (2), the extension member (7) is positioned substantially in front of the top cover (5), when viewed in the travel direction (F) of the convertible;

wherein the extension member (7) is pivotable relative to the too cover (5) such that the extension member (7), when the top (2) is in the closed position, is positioned in a stored position at a relative angle (α) to the top cover (5) underneath the top cover (5), wherein the relative angle (α) in the stored position is a right angle or substantially at a right angle;

a pivot hinge having a pivot axis (5) and connected to the extension member (7) and the top cover (5), wherein the pivot hinge is configured to pivot the extension member (7) relative to the too cover (5) about the pivot axis (8); and wherein the pivot axis (8) is provided in a rearward area of the top cover (5) viewed in the travel direction (F).

8. A convertible comprising:

a top (2) storable in a rear part of the convertible when the top (2) is in an open position;

a top cover (5), wherein the top (2) in the open position is stored underneath the top cover (5);

wherein the top cover (5) is movable for releasing a passageway opening for the top (2) via which the top (2) is moved for storing the top (2) in the open position and for returning the top (2) from the open position into a closed position;

wherein, in the open position of the top (2), the extension member (7) is positioned substantially in front of the top cover (5), when viewed in the travel direction (F) of the convertible;

wherein the extension member (7) is pivotable relative to the top cover (5) such that the extension member (7), when the top (2) is in the closed position, is positioned in a stored position at a relative angle (α) to the top cover (5) underneath the top cover (5), wherein the relative angle (α) in the stored position is a right angle or substantially at a right angle;

linkage parts (6) configured to connect the top (2) with bearings positioned underneath a plane (4) defined by the top cover (5) when closed, wherein the linkage parts (6), when the top (2) is in the closed position, penetrate the plane (4) of the top cover (5); and covering parts (14) positioned below the plane (4) of the top cover (5) and configured to shield the linkage parts (6) relative to the interior of the convertible, when the top (2) is in the open position.

9. The convertible according to claim 8, wherein the covering parts (14) are pivotable about horizontal axes (15) extending parallel to a longitudinal direction of the convertible and, when the top cover (5) is closed, are positioned vertically or slantedly upright and visually shield the linkage parts (6) relative to the interior of the convertible.

10. The convertible according to claim 8, wherein the covering parts (14) are positioned underneath the extension member (7) when the top (2) is in the open position.

* * * * *